United States Patent [19]
Martin

[11] 3,862,471

[45] Jan. 28, 1975

[54] VISCERA SEPARATOR

[75] Inventor: Roger C. Martin, Cocoa Beach, Fla.

[73] Assignee: Edgar E. Griffis, Brevard County, Fla.; a part interest

[22] Filed: Oct. 13, 1972

[21] Appl. No.: 297,310

[52] U.S. Cl. .......................................... 17/45, 17/53
[51] Int. Cl. .............................................. A22c 29/00
[58] Field of Search ................. 17/65, 52, 53, 45, 54

[56] References Cited
UNITED STATES PATENTS
2,808,612  10/1957  Snow .................................. 17/65 X
3,129,456  4/1964  Renfroe .................................. 17/52

Primary Examiner—Hugh R. Chamblee
Attorney, Agent, or Firm—Berman, Bishoff & Platt

[57] ABSTRACT

Viscera, removed from scallop meat, is delivered with water from an eviscerator, through a delivery chute onto the outer surface of a perforated rotating cylinder. As the viscera rotates on the surface of the cylinder, it is dried by contact with the air and water adhering to the viscera is allowed to drip through the cylinder perforations. A spring-loaded scraper blade is in contact with the surface of the rotating cylinder and removes the viscera therefrom, causing it to fall into a container formed of screen-like material. The screen-like material permits complete drainage to take place of whatever water might continue to adhere to the viscera. The viscera may then be removed from the screen container, in a clean and relatively dry condition, and further processed into food products.

7 Claims, 3 Drawing Figures

PATENTED JAN 28 1975  3,862,471

VISCERA SEPARATOR

This invention relates to scallop processing, and more particularly relates to a method of separating and processing scallop viscera after evisceration has taken place.

In my co-pending application entitled "Scallop Eviscerator," filed on Oct. 13, 1972 Ser. No. 297,313, I disclosed a new and improved apparatus for eviscerating scallops. As explained in that application, in order to prepare scallops for packaging for human consumption, it is necessary to separate the edible firm muscle portion of the scallop from the undesirable, slimy viscera which holds firmly to the muscle and is difficult to remove. My aforesaid application, discloses a suitable method and apparatus for overcoming the problems encountered in the prior art eviscerators, such as that disclosed in U.S. Pat. No. 3,528,124 to Wenstrom.

As a result of my eviscerating apparatus and method, I have discovered that the large quantities of viscera produced thereby need not be discarded as was previously believed. Rather, I have found that viscera has substantial nutritional value, and therefore may, after proper processing, serve as an animal feed, and in certain cases as a low cost food supplement for human beings. In view of the gelatinous nature of scallop viscera, however, it is extremely difficult to handle and process in an efficient manner.

Accordingly, it is a prime object of the present invention to provide a method and apparatus for separating and recovering scallop and other shellfish viscera after the shellfish have undergone evisceration.

A further object of the present invention is to provide an improved method and apparatus for automatically handling and drying scallop and other shellfish viscera in preparation for further processing.

Briefly, in the present invention, viscera, separated from the scallop and mixed with water, is delivered from the eviscerator, by a chute and is deposited on a rotating hollow cylinder having perforations therein. The viscera adhere to the surface of the cylinder and undergo dehydration as the cylinder rotates at a speed which is adjusted according to the prevailing conditions. A spring-loaded scraper blade is disposed across the surface of the cylinder and removes the viscera therefrom. A wire mesh container is placed below the scraper blade for catching the viscera and permitting further dehydration. When a sufficient quantity of viscera have been accumulated in the container, the container may then be removed to feed the viscera to further processing apparatus.

Other objects, features and advantages of the present invention will become more readily apparent from a consideration of the following detailed description taken in conjunction with the appended sheet of drawings, in which.

Figure 1:
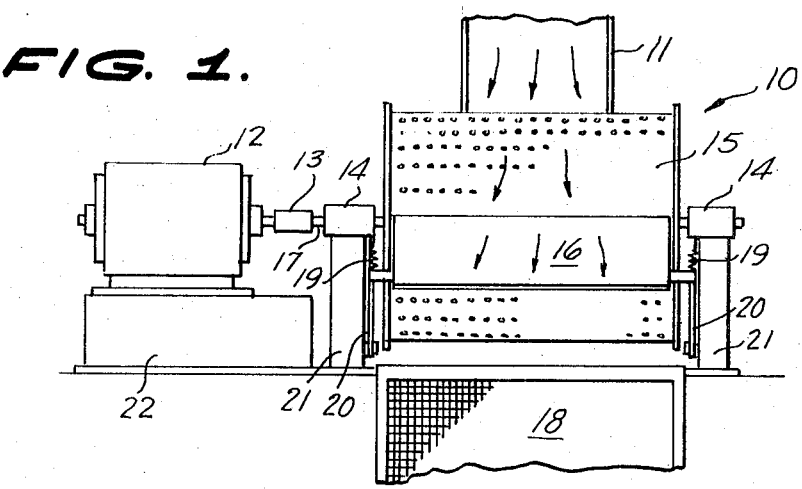
FIG. 1 is a front elevational view of the viscera separator according to the present invention.

Referring now to the drawing, wherein like reference numerals designate like parts throughout the several views thereof, there is shown the viscera separator according to the present invention generally designated by the reference character 10. Viscera separator 10 comprises a hollow perforated drum 15 mounted for rotation on shaft 17 by means of support spokes 23.

Shaft 17 is journaled in bearings 14 which are mounted on supports 21. Shaft 17 is driven by variable speed hydraulic motor 12 through coupling 13. Mounting unit 22 is provided for supporting motor 12.

Scraper blade 16, which may be formed of a relatively thin semi-rigid substantially rectangular sheet of metal, is supported by arms 20 so that one edge thereof lies across the surface of drum 15 in wiping relationship thereto. Arms 20 are joined at one end to scraper blade 16 and at the other end to vertical supports 21. Connected to the approximate midpoint of arms 20 are biasing springs 19, connected at their other ends to bearings 14, which urge arms 20 upwardly, as viewed in FIG. 3, and therefore retain scraper blade 16 in contact with the surface of drum 15.

Disposed above rotating drum 15 is feed chute 11 for depositing viscera from an eviscerator onto the surface of the drum. Located below drum 15 and underneath scraper blade 16 is a box-like container 18 formed of wire screening or the like, for receiving the viscera as scraper blade 16 removes them from the surface of drum 15.

Figure 2:
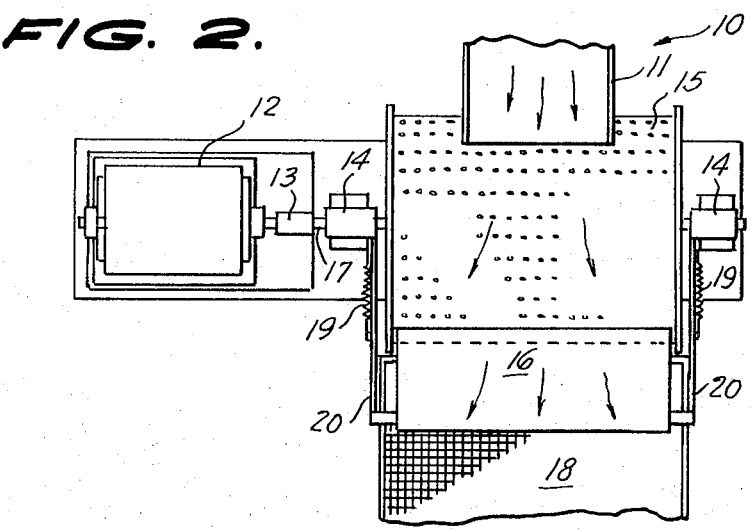
FIG. 2 is a top plan view of the viscera separator according to the present invention.
Figure 3:
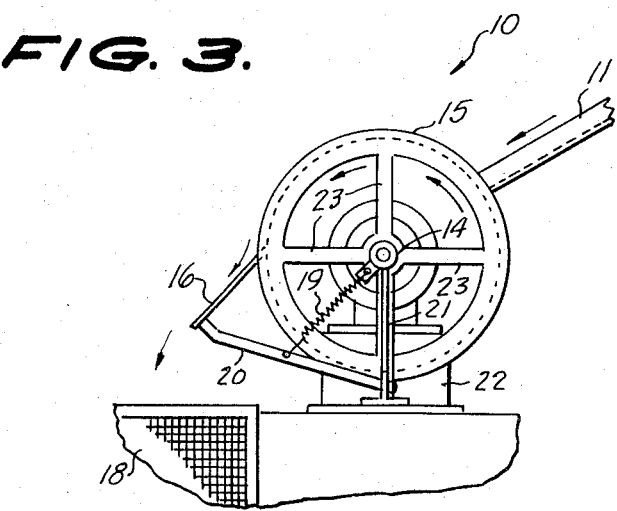
FIG. 3 is a side elevational view of the viscera separator according to the present invention.

In operation, viscera mixed with water are fed from an eviscerator such as that described in my aforesaid co-pending application or in the Wenstrom patent, via chute 11 onto the surface of drum 15 which is rotating at a constant speed toward scraper blade 16, as shown in FIG. 3. The optimum speed of rotation for drum 15 has been found to be in the range of ten to twenty rotations per minute. The water mixed with the viscera passes through the perforations in drum 15, so that the viscera are allowed to become at least partially dehydrated while they remain on the surface of the drum. As the drum passes by scraper blade 16, which is forcefully urged against its surface by springs 19, the viscera will be scraped from the surface of the drum, pass downwardly along the surface of scraper blade 16, as shown by the direction of the arrows in FIGS. 1, 2 and 3, and be deposited in container 18. The open mesh construction of container 18 will permit the viscera to drain further, if necessary, and undergo further dehydration. When container 18 is sufficiently filled with viscera, motor 12 will be turned off, stopping the rotation of drum 15, and container 18 will be removed to a location where the viscera may be unloaded for further processing as desired.

While a specific embodiment of the invention has been described and illustrated, it will be recongized by those with skill in the art that various modifications may be made therein without departing from the spirit and intent of the invention. Therefore, it is intended that the scope of the invention be defined only by the claims appended hereto.

I claim:

1. Apparatus for processing shellfish viscera which have been separated from the body of said shellfish, comprising:
   a. a rotatably mounted hollow cylinder having a plurality of perforations therein of a diameter smaller than the diameter of said viscera;
   b. feed chute means disposed above said cylinder for feeding said separated viscera onto the outer surface of said cylinder so as to at least partially dehydrate said viscera;

c. scraper blade means mounted parallel to the longitudinal axis of said cylinder with one edge thereof in contact with the surface of said cylinder; and d. means for rotating said cylinder past said wiper blade so as to scrape said partially dehydrated separated viscera from said outer surface of the cylinder.

2. The apparatus set forth in claim 1, further including means for urging said scraper blade against the surface of said drum.

3. The apparatus set forth in claim 2, wherein said means for urging comprises spring-biased means.

4. The apparatus set forth in claim 1, further including means for further dehydrating said removed viscera.

5. The apparatus set forth in claim 4, wherein said means for further dehydrating comprises a container formed of mesh and positioned below said cylinder for receiving said viscera scraped from the outer surface of said cylinder.

6. The method of processing shellfish viscera comprising the steps of;

a. separating said viscera from the shellfish;

b. depositing said separated viscera mixed with water on a perforated member;

c. rotating the perforated member; and d. scraping the viscera from the surface of the perforated member.

7. The method set forth in claim 6, including the further step of depositing the scraped viscera in a receptacle for draining.

* * * * *